US009838133B2

(12) United States Patent
Kan et al.

(10) Patent No.: US 9,838,133 B2
(45) Date of Patent: Dec. 5, 2017

(54) COMPENSATION OF NON-LINEAR TRANSMITTER IMPAIRMENTS IN OPTICAL COMMUNICATION NETWORKS

(71) Applicant: Futurewei Technologies, Inc., Plano, TX (US)

(72) Inventors: Clarence Kan, Bridgewater, NJ (US); Fei Zhu, San Jose, CA (US); Zhihong Li, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/390,148

(22) Filed: Dec. 23, 2016

(65) Prior Publication Data

US 2017/0111117 A1 Apr. 20, 2017

Related U.S. Application Data

(62) Division of application No. 14/341,373, filed on Jul. 25, 2014, now Pat. No. 9,571,198.

(51) Int. Cl.

| | |
|---|---|
| ***H04B 10/60*** | (2013.01) |
| ***H04B 10/40*** | (2013.01) |
| ***H04B 10/61*** | (2013.01) |

(52) U.S. Cl.

CPC ........... *H04B 10/40* (2013.01); *H04B 10/616* (2013.01); *H04B 2210/252* (2013.01)

(58) Field of Classification Search

CPC ...... H04B 10/50; H04B 10/40; H04B 10/616; H04B 2210/252

(Continued)

(56) References Cited

U.S. PATENT DOCUMENTS

| | | | |
|---|---|---|---|
| 6,469,812 | B2 | 10/2002 | McKiel, Jr. |
| 6,847,788 | B2 | 1/2005 | Nakajima et al. |

(Continued)

FOREIGN PATENT DOCUMENTS

| | | | |
|---|---|---|---|
| CN | 101207445 | A | 6/2008 |
| CN | 102136871 | A | 7/2011 |

(Continued)

OTHER PUBLICATIONS

Partial English Translation and Abstract of Chinese Patent Application No. CN102136871, dated Oct. 21, 2016, 6 pages.

(Continued)

*Primary Examiner* — Ken N Vanderpuye
*Assistant Examiner* — Dibson Sanchez
(74) *Attorney, Agent, or Firm* — Conley Rose, P.C.

(57) ABSTRACT

An optical transceiver comprises a transmitter configured to transmit a first signal, and a receiver coupled to the transmitter and configured to receive a first compensation, wherein the first compensation is based on a pattern-dependent analysis of the first signal, and provide the first compensation to the transmitter, wherein the transmitter is further configured to compensate a second signal based on the first compensation to form a first compensated signal, and transmit the first compensated signal. An optical transmitter comprises a digital signal processor (DSP) comprising a compensator, a digital-to-analog converter (DAC) coupled to the DSP, a radio frequency amplifier (RFA) coupled to the DAC, and an electrical-to-optical converter (EOC) coupled to the RFA. An optical receiver comprises an optical-to-electrical converter (OEC), an analog-to-digital converter (ADC) coupled to the OEC, and a digital signal processor (DSP) coupled to the ADC and comprising a calibrator.

4 Claims, 12 Drawing Sheets

(58) Field of Classification Search
USPC .......................................... 398/136, 202–214
See application file for complete search history.

(56) References Cited

U.S. PATENT DOCUMENTS 7,027,537 B1* 4/2006 Cheong ................ H04B 1/1036 375/285
7,062,177 B1 6/2006 Grivna et al.
7,076,173 B2 7/2006 Cremer
7,113,708 B1 9/2006 Creaney et al.
7,386,240 B2 6/2008 Thomson et al.
7,581,891 B2 9/2009 Wang
7,672,599 B2 3/2010 Essiambre et al.
8,000,607 B2 8/2011 Hsieh
8,041,226 B2 10/2011 Kato
8,270,843 B2 9/2012 Nakamoto
8,909,061 B1* 12/2014 Varadarajan ....... H04B 10/6161 398/159
9,036,751 B1* 5/2015 Wang ...................... H04L 25/03 375/232
9,363,032 B2* 6/2016 Renaudier ............. H04L 1/0035
2002/0145787 A1* 10/2002 Shpantzer .......... H04B 10/2543 398/99
2004/0063416 A1* 4/2004 Kuenen .............. H04L 27/3863 455/313
2004/0106380 A1* 6/2004 Vassiliou ............... H04B 17/20 455/73
2004/0120422 A1* 6/2004 Lin ........................ H04L 27/34 375/316
2004/0197103 A1 10/2004 Roberts et al.
2005/0232635 A1 10/2005 Aronson et al.
2006/0008279 A1 1/2006 Chiang et al.
2006/0078336 A1 4/2006 McNicol et al.
2007/0009266 A1 1/2007 Bothwell et al.
2007/0206954 A1* 9/2007 Fishman ............ H04B 10/2513 398/159
2007/0222654 A1 9/2007 Vrazel et al.
2008/0013950 A1* 1/2008 Boudreault ......... H04J 14/0212 398/59
2008/0232820 A1 9/2008 Burchfiel
2009/0175629 A1 7/2009 Liu et al.
2009/0196602 A1* 8/2009 Saunders ........... H04B 10/5053 398/26
2009/0238580 A1 9/2009 Kikuchi
2009/0245809 A1* 10/2009 Nakamoto ......... H04B 10/2507 398/159
2009/0279890 A1 11/2009 Duan et al.
2010/0067902 A1* 3/2010 Sun .................... H04B 10/0799 398/25
2010/0135656 A1 6/2010 Khurgin et al.
2011/0052195 A1 3/2011 Karstens
2011/0064421 A1* 3/2011 Zhang ................ H04B 10/6161 398/208
2011/0211842 A1* 9/2011 Agazzi .................. H04B 10/40 398/141
2011/0255876 A1 10/2011 Sugihara et al.
2011/0255879 A1 10/2011 Xie et al.
2012/0008952 A1 1/2012 Li et al.
2012/0057863 A1* 3/2012 Winzer .................. H04B 10/60 398/3
2012/0081780 A1 4/2012 Qian et al.
2012/0082468 A1 4/2012 Qian et al.
2012/0141134 A1 6/2012 Hauske
2012/0183289 A1* 7/2012 Lou ........................ H04B 10/40 398/9
2012/0224849 A1 9/2012 Rylyakov et al.
2012/0301157 A1 11/2012 Qian et al.
2013/0336649 A1* 12/2013 Essiambre ............. H04L 27/06 398/27
2014/0147117 A1 5/2014 Kikuchi
2015/0180570 A1* 6/2015 Malouin ............ H04B 10/0795 398/25

FOREIGN PATENT DOCUMENTS

CN 102835046 A 12/2012
WO 2010104783 A1 9/2010

OTHER PUBLICATIONS

Ke, J., et al., "400 Gbit/s Single-Carrier and 1 Tbit/s Three-Carrier Superchannel Signals Using Dual Polarization 16-QAM with Look-up Table Correction and Optical Pulse Shaping," Optics Express, vol. 22, No. 1, Dec. 20, 2013, pp. 71-83.
Ke, J., et al., "Three-Carrier 1 Tbit/s Dual Polarization 16-QAM Superchannel Using Look-Up Table Correction and Optical Pulse Shaping," 39th European Conference and Exhibition on Optical Communication (ECOC 2013), Sep. 2013, 3 pages.
Dawson, J., "Power Amplifier Linearization Techniques: An Overview," Workshop on RF Circuits for 2.5G and 3G Wireless Systems, Feb. 4, 2001, 27 pages.
"Agilent EEs of EDA—Presentation on Digital Predistortion of Power Amplifiers," Agilent Technologies, Jun. 2001, 33 pages.
Liebetreu, J., et al., "Proposed System Impairment Models," IEEE 802.16 Broadband Wireless Access Working Group (Rev. 0), Document No. IEEE 802.16.1pp-00/15, Mar. 8, 2000, 35 pages.
Foreign Communication From a Counterpart Application, PCT Application No. PCT/CN2015/084681, International Search Report dated Sep. 25, 2015, 9 pages.
Foreign Communication From a Counterpart Application, PCT Application No. PCT/CN2015/084681, Written Opinion dated Sep. 25, 2015, 5 pages.
Office Action dated Apr. 15, 2016, 7 pages, U.S. Appl. No. 14/341,373, filed on Jul. 25, 2014.
Office Action dated May 18, 2016, 22 pages, U.S. Appl. No. 14/341,373, filed on Jul. 25, 2014.
Notice of Allowance dated Nov. 18, 2016, 12 pages, U.S. Appl. No. 14/341,373, filed on Jul. 25, 2014.
Foreign Communication From a Counterpart Application, European Application No. 15824672.8, Extended European Search Report dated Jun. 29, 2017, 12 pages.

* cited by examiner

600

| PATTERN INDEX | ADJUSTMENT |
| --- | --- |
| ⋮ | ⋮ |
| 896 | 0.06 |
| ⋮ | ⋮ |
| 912 | 0.03 |
| ⋮ | ⋮ |
| 976 | 0.04 |
| ⋮ | ⋮ |

COMPENSATION OF NON-LINEAR TRANSMITTER IMPAIRMENTS IN OPTICAL COMMUNICATION NETWORKS

CROSS-REFERENCE TO RELATED APPLICATIONS

This application is a divisional application of U.S. patent application Ser. No. 14/341,373 filed on Jul. 25, 2014 by Clarence Kan, et al., and titled "Compensation of Non-Linear Transmitter Impairments in Optical Communication Networks," which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Optical communication networks serve an important function in worldwide communication. They have increasingly replaced copper wire communications due to various advantages that they offer. Optical communication networks may include various nodes connected by optical fibers or free space. As users demand higher data rates, it is becoming increasingly important to transmit and receive optical data more accurately.

SUMMARY

In one embodiment, the disclosure includes an optical transceiver comprising a transmitter configured to transmit a first signal, and a receiver coupled to the transmitter and configured to receive a first compensation, wherein the first compensation is based on a pattern-dependent analysis of the first signal, and provide the first compensation to the transmitter, wherein the transmitter is further configured to compensate a second signal based on the first compensation to form a first compensated signal, and transmit the first compensated signal.

In another embodiment, the disclosure includes an optical transmitter comprising a digital signal processor (DSP) comprising a compensator, a digital-to-analog converter (DAC) coupled to the DSP, a radio frequency amplifier WA) coupled to the DAC, and an electrical-to-optical converter (EOC) coupled to the RFA.

In yet another embodiment, the disclosure includes an optical receiver comprising an optical-to-electrical converter (OEC), an analog-to-digital converter (ADC) coupled to the OEC, and a digital signal processor (DSP) coupled to the ADC and comprising a calibrator.

In yet another embodiment, the disclosure includes a method comprising transmitting a first optical signal, receiving a first compensation, wherein the first compensation is based on a pattern-dependent analysis of the first optical signal, compensating a second optical signal based on the first compensation to form a first compensated optical signal, and transmitting the first compensated optical signal.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
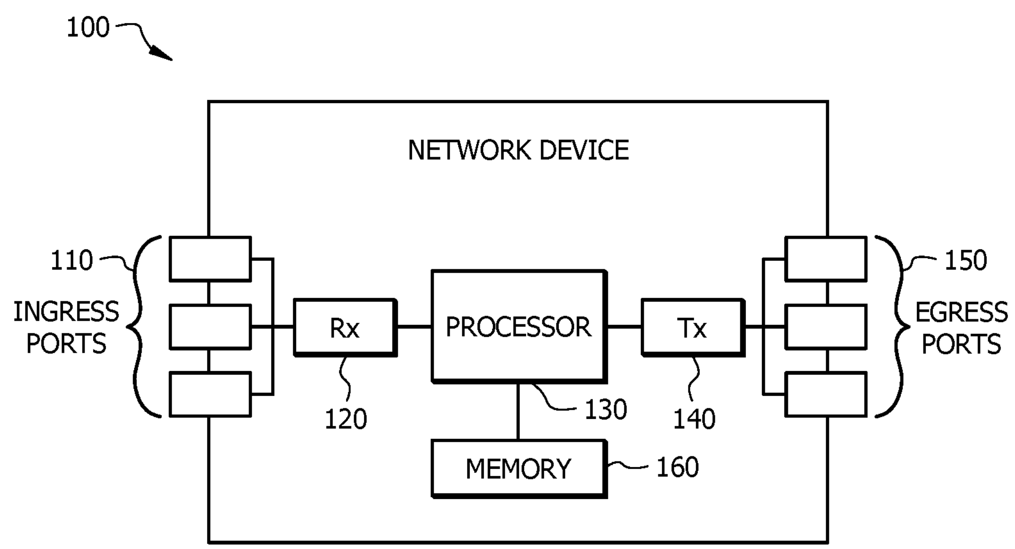
FIG. 1 is a schematic diagram of a network device.

FIG. 1 is a schematic diagram of a network device 100. The network device 100 may be suitable for implementing the disclosed embodiments. The network device 100 may comprise ingress ports 110 and receiver units (Rx) 120 for receiving data; a processor, logic unit, or central processing unit (CPU) 130 to process the data; transmitter units (Tx) 140 and egress ports 150 for transmitting the data; and a memory 160 for storing the data. The network device 100 may also comprise optical-to-electrical (OE) components and electrical-to-optical (EO) components coupled to the ingress ports 110, receiver units 120, transmitter units 140, and egress ports 150 for egress or ingress of optical or electrical signals.

The processor 130 may be implemented by hardware and software. The processor 130 may be implemented as one or more CPU chips, cores (e.g., as a multi-core processor) field-programmable gate arrays (FPGAs), application specific integrated circuits (ASICs), and digital signal processors (DSPs). The processor 130 may be in communication with the ingress ports 110, receiver units 120, transmitter units 140, egress ports 150, and memory 160.

The memory 160 may comprise one or more disks, tape drives, and solid-state drives; may be used as an over-flow data storage device; may be used to store programs when such programs are selected for execution; and may be used to store instructions and data that are read during program execution. The memory 160 may be volatile and non-volatile and may be read-only memory (ROM), random-access memory (RAM), ternary content-addressable memory (TCAM), and static random-access memory (SRAM).

Figure 2:
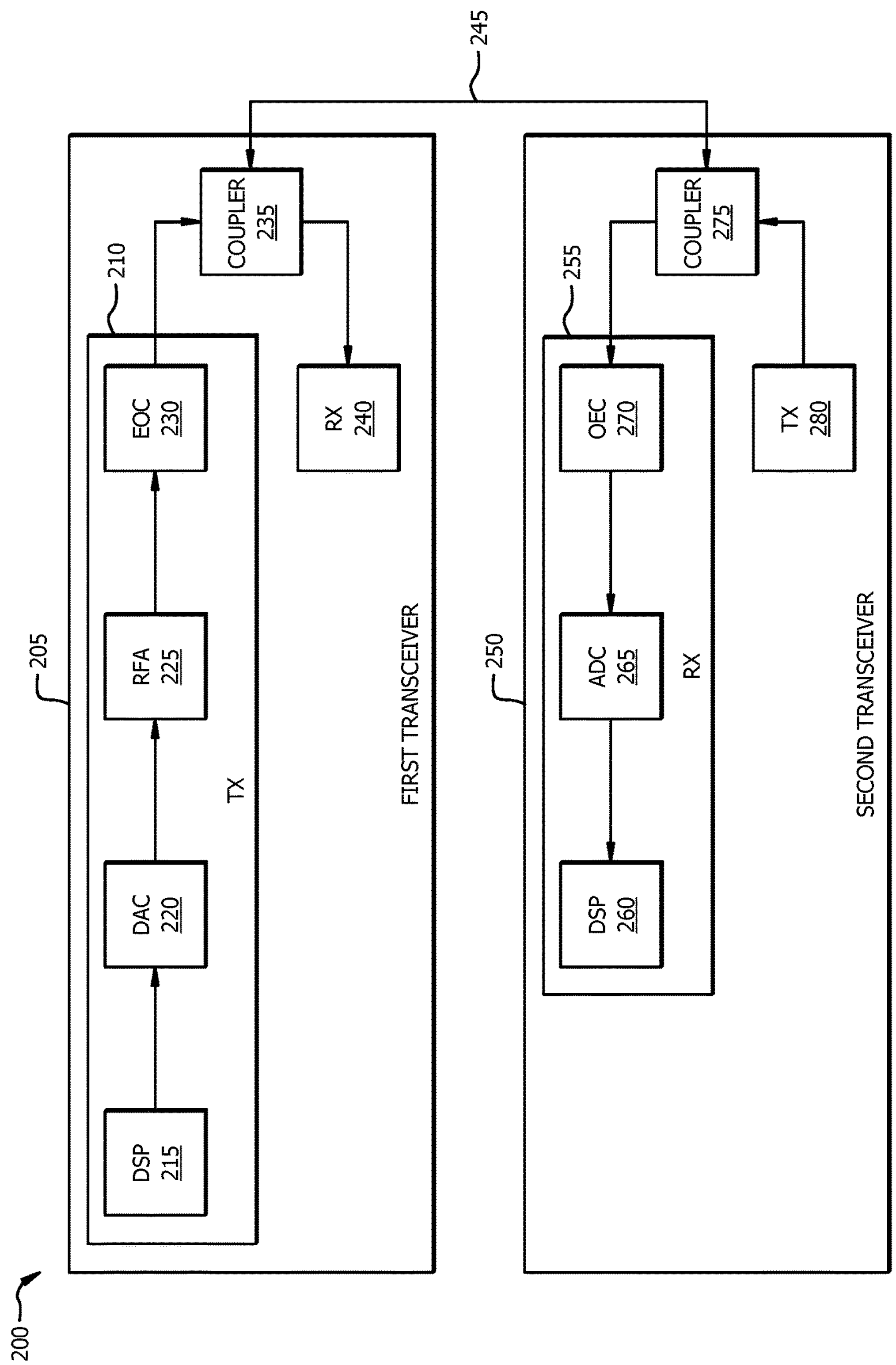
FIG. 2 is a schematic diagram of an optical network according to an embodiment of the disclosure.

FIG. 2 is a schematic diagram of an optical network 200. The network 200 may comprise a first transceiver 205 and a second transceiver 250 in communication with each other via a medium 245. The components of the optical network 200 may be arranged as shown or in any other suitable manner. Some of the components may comprise multiple inputs and multiple outputs that may, for instance, run in parallel; however, the components may be simplified for easier understanding.

As an example, the first transceiver 205 may be located in any node in an optical network and the second transceiver 250 may be located in any other node in the optical network. Alternatively, the TX 210 and the RX 255 may be part of a single transceiver in a fiber loop-back configuration. Furthermore, the first transceiver 205 and the second transceiver 250 may be located in any optical communication network, including a long-haul network, a metropolitan network, a passive optical network (PON), or another optical network using high-order modulation.

The first transceiver 205 may be any transceiver suitable for transmitting and receiving optical signals. The first transceiver 205 may comprise a transmitter (TX) 210 and a receiver (RX) 240 coupled to each other via a coupler 235. The TX 210 may comprise modules, including a digital signal processor (DSP) 215, a digital-to-analog converter (DAC) 220, a radio frequency amplifier (RFA) 225, and an electrical-to-optical converter (EOC) 230. The components of the first transceiver 205 may be arranged as shown or in any other suitable manner.

The medium 245 may be any medium suitable for providing communication between the first transceiver 205 and the second transceiver 250. For instance, the medium 245 may be an optical fiber cable. In that case, the medium 245 may comprise one or more optical fibers that each comprises a core and a cladding layer, and the medium 245 may be contained in a tube to protect from the environment.

The second transceiver 250 may be any transceiver suitable for transmitting and receiving optical signals. The second transceiver 250 may comprise an RX 255 and a TX 280 coupled to each other via a coupler 275. The RX 255 may comprise various modules, including a DSP 260, an analog-to-digital converter (ADC) 265, and an optical-to-electrical converter (OEC) 270. The components of the second transceiver 250 may be arranged as shown or in any other suitable manner. The first transceiver 205 and the second transceiver 250 may comprise additional components known in the art in order for the first transceiver 205 and the second transceiver 250 to communicate with each other.

The first transceiver 205 may need to transmit signals to the second transceiver 250. In order to generate a high-order modulation signal over an in-phase (I) and quadrature-phase (Q) optical modulator, first, the DSP 215 may form multi-level I and Q digital electrical signals and pre-condition those digital electrical signals. Second, the DAC 220 may convert the digital electrical signals to analog electrical signals. The DAC 220 may have a finite resolution and frequency response. Third, the RFA 225 may amplify the analog electrical signals. The RFA. 225 may have a finite bandwidth. Fourth, the EOC 230, which may comprise a Mach-Zehnder modulator, may convert the analog electrical signals into optical signals. Fifth, the first transceiver 205 may transmit the optical signals through the coupler 235 and the medium 245 to the second transceiver 250.

The second transceiver 250 may first receive the optical signals over the medium 245 and through the coupler 275. Second, the OEC 270 may convert the optical signals to analog electrical signals. Third, the ADC 265 may convert the analog electrical signals into digital electrical signals. Fourth, the DSP 260 may process the digital electrical signals as appropriate.

Figure 3:
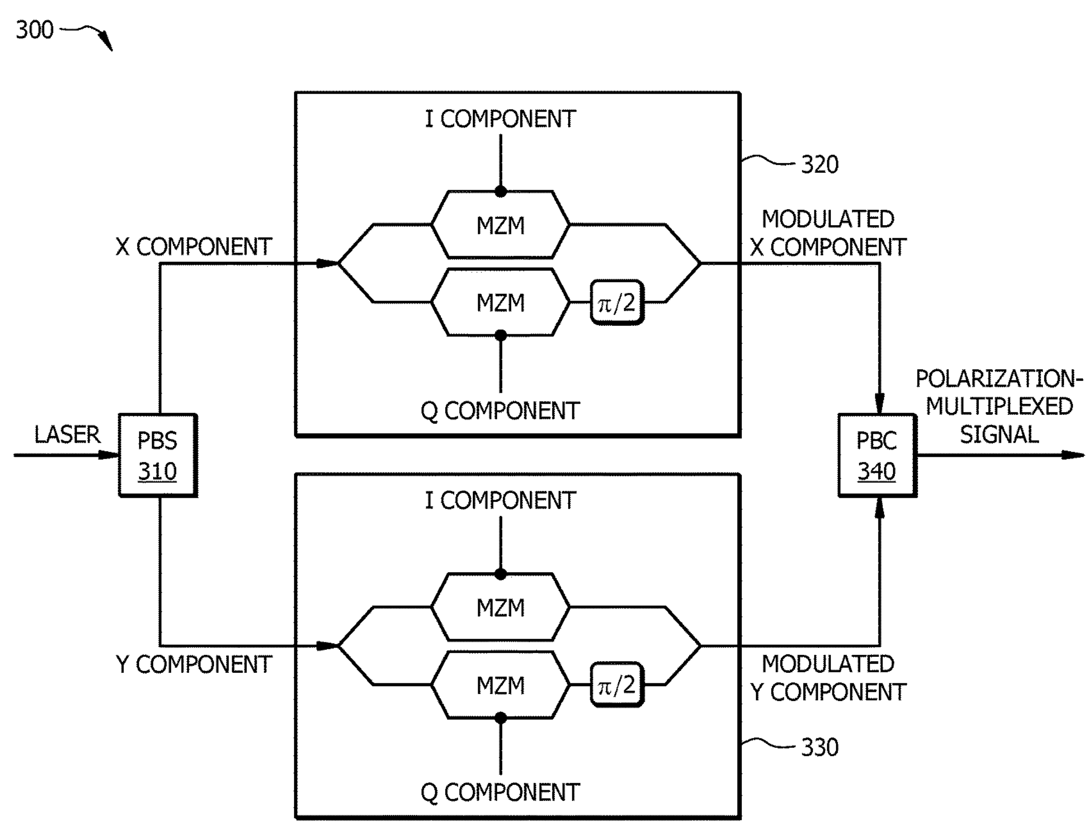
FIG. 3 is a schematic diagram of an optical modulator according to an embodiment of the disclosure.

FIG. 3 is a schematic diagram of an optical modulator 300. The modulator 300 may be a polarization-multiplexed I and Q Mach-Zehnder and may be used in the EOC 230. The modulator 300 may comprise a polarization beam splitter (PBS) 310, a first Mach-Zehnder modulator array 320, a second Mach-Zehnder modulator array 330, and a polarization beam coupler (PBC) 340. The components of the modulator 300 may be arranged as shown or in any other suitable manner.

The PBS 310 may split a laser into an X polarization component and a Y polarization component. The first Mach-Zehnder modulator array 320 may split the X polarization component into a first component and second component and modulate the first component as an $X_I$ component and the second component as an $X_Q$ component. The $X_Q$ component may he voltage-biased to have π/2 optical phase shift compared to the $X_I$ component. The first Mach-Zehnder modulator array 320 may then multiplex the $X_I$ component and the $X_Q$ component together to form a modulated X component. The second Mach-Zehnder modulator array 330 may split the Y polarization component into a first component and second component and modulate the first component as a $Y_I$ component and the second component as a $Y_Q$ component. The $X_Q$ component may be voltage-biased to have π/2 optical phase shift compared to the $X_I$ component. The second Mach-Zehnder modulator array 320 may then multiplex the $Y_I$ component and the $Y_Q$ component together to form a modulated Y component. Finally, the PBC 340 may couple, or multiplex, the modulated X component and the modulated Y component to form a polarization-multiplexed signal.

High-order modulation is a promising technology to achieve spectrally-efficient terabit (Tb) transmission in optical networks such as the network 200. High-order modulated signals can be generated by modulators such as the optical modulator 300. By modulating both the X polarization component and the Y polarization component, the optical modulator 300 may double the spectral efficiency.

Using existing approaches to pre-conditioning of the digital electrical signals in the DSP 215 in the first transceiver 205, the signals can substantially deviate from the expected values due to non-linear responses of the electrical and optical components of the TX 210 in the first transceiver 205. Those deviations, or impairments, may cause a poor BER at a coherent receiver such as the RX 255 in the second transceiver 250. A poor BER may shorten transmission distances, which may increase the need for signal regeneration, thus resulting in higher infrastructure costs.

The impairments may comprise two parts, a static part that does not depend on the data pattern and a dynamic part that does depend on the data pattern. The dynamic part that does depend on the data pattern may be caused by a memory effect. With application of a near-Nyquist pulse-shaping filter such as a raised-root-cosine (RRC) filter with a roll-off factor of less than 0.2, the level deviation becomes essentially pattern dependent due to filtering-induced inter-symbol interference (ISI).

DSP techniques may at leak partially equalize, or compensate, the impairments. At the TX 210 in the first transceiver 205, a frequency-domain equalizer (FDEQ) and a finite impulse response pre-equalizer (FIR) may compensate linear impairments such as radio frequency (RF) bandwidth limitations or I-Q delays. At the RX 255 in the second transceiver 250, an FDEQ may compensate for fiber chromatic dispersion and perform frequency filtering optimization, including bandwidth compensation. A time-domain equalizer (TDEQ) and carrier recovery (CR) module may recover the transmitted X polarization and Y polarization and compensate for polarization mode dispersion, and carrier phase recovery. Those DSP techniques may not, however, compensate for non-linear, pattern-dependent impairments.

Prior approaches to compensate for non-linear, pattern-dependent impairments include Joel L. Dawson, "Power Amplifier Linearization Techniques: An Overview," Feb. 4, 2001 ("Dawson"); Shawn P. Stapleton, "Presentation on Digital Predistortion of Power Amplifiers," June 2001 ("Stapleton"); Jian Hong Ke, et al., "Three-carrier 1 Tbit/s Dual Polarization 16-QAM Superchannel Using Look-Up Table Correction and Optical Pulse Shaping," Optics Express, Vol. 22, No. 1, Jan. 13, 2014 ("Ke 1"); and Jian Hong Ke, et al., "400 Gbit/s single-carrier and 1 Tbit/s three-carrier superchannel signals using dual polarization 16-QAM with look-up table correction and optical pulse shaping," Optics Express, Vol. 22, No. 1, Dec. 20, 2013 ("Ke 2"), which are incorporated by reference. Ke 1's and Ke 2's first approach uses a digitally sampled signal at the transmitter to generate a PD-LUT. The sampled signal is then adjusted based on the PD-LUT to produce an equalized, or compensated, driver amplitude. First, that approach may require additional hardware, including an RF splitter and an ADC at the transmitter to acquire the sampled drive signal. Second, that approach may result in driver power loss. Third, that approach may incorrectly compensate intentional pre-distortion such as pulse shaping, bandwidth pre-compensation, and dispersion pre-compensation, which may be used to compensate transmission impairments after the point where the signal is sampled. Ke 1's and Ke 2's second approach generates the PD-LUT and compensates the signal at the receiver DSP. Both approaches describe a single iteration of calibration and compensation.

Disclosed herein are embodiments for improved compensation of transmitter impairments. Those impairments may be non-linear, pattern-dependent impairments. The disclosed embodiments may provide for calibration by generating a compensation, which may be a PD-LUT, based on a pattern-dependent analysis of data received at a receiver, then pattern-dependent level equalization (PD-LEQ) or compensation, in a transmitter based on the PD-LUT. There may be multiple iterations of calibration and compensation with each successive iteration providing improved compensation. The disclosed embodiments may be suitable for any optical communication network, including a PON, a long-haul network, a metropolitan network, or another optical network using high-order modulation. The disclosed embodiments may provide at least three benefits. First, by generating the PD-LUT based on the pattern-dependent analysis of data received at the receiver and not the transmitter, the transmitter may not require any additional hardware, which may reduce transmitter size and cost. Second, there may be less or no undesired compensation of intentional pre-distortion such as bandwidth pre-compensation, pulse shaping, and dispersion pre-compensation. Third, by calibrating in the receiver after the DSP, including after the TDEQ, then compensating in the transmitter, the impairments may be more accurately compensated because the data sequence is error-free and the data patterns can be accurately determined at the transmitter. Fourth, multiple iterations of calibration and compensation may further improve compensation and thus further reduce the BER at the receiver.

Figure 4:
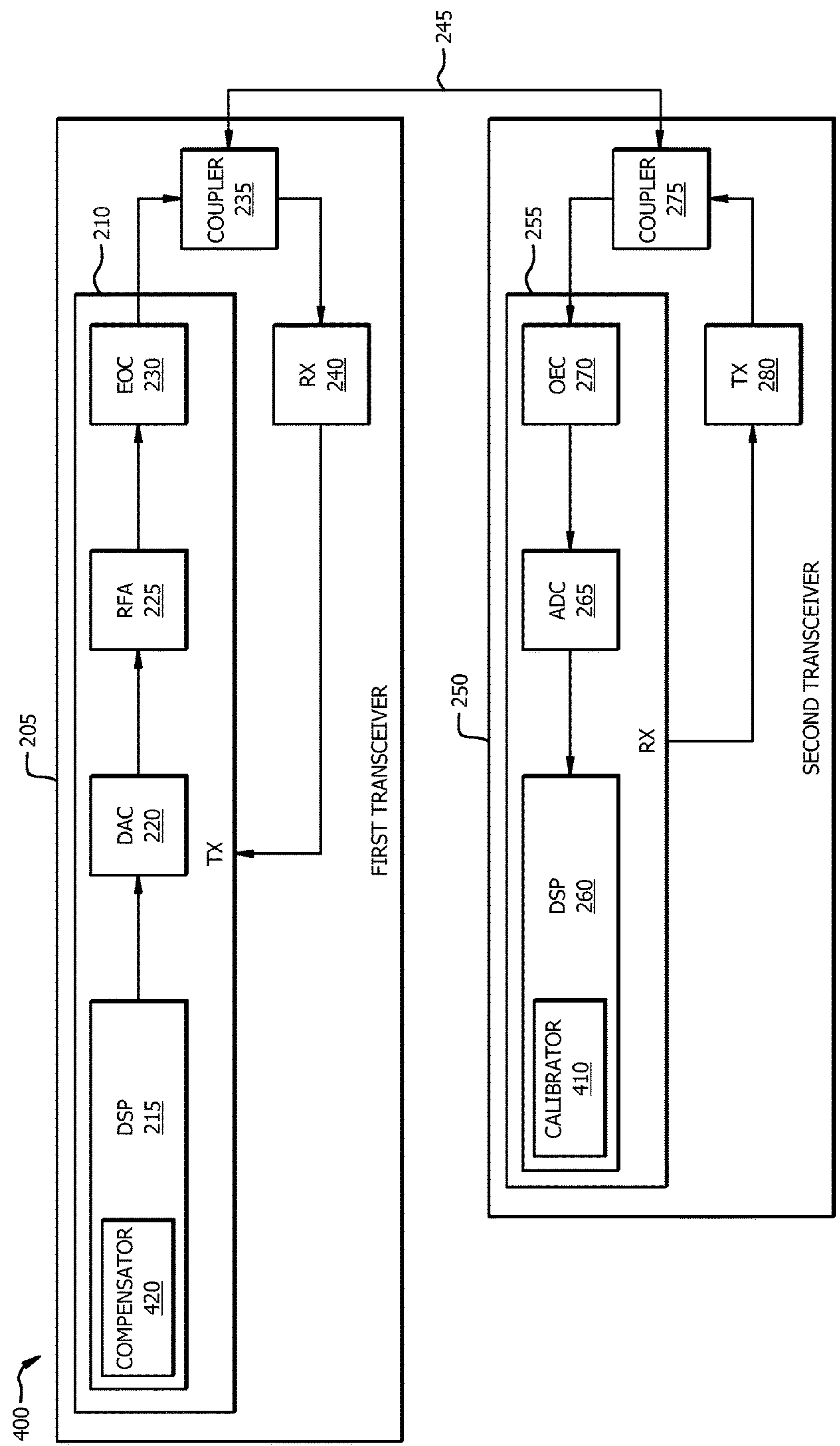
FIG. 4 is a schematic diagram of an optical network according to another embodiment of the disclosure.

FIG. 4 is a schematic diagram of an optical network 400 according to an embodiment of the disclosure. As can be seen, the network 400 may be the same as, and function the same as, the network 200 with a few exceptions. First, the DSP 260 in the second transceiver 250 may comprise an additional module, a calibrator 410. Second, the RX 255 may communicate with the TX 280 in the second transceiver 250 to, for instance, provide a PD-LUT. Third, the DSP 215 in the first transceiver 205 may comprise an additional module, a compensator 420. The TX 210 may not comprise any additional signal processing modules before the compensator 420. Fourth, the TX 210 may communicate with the RX 240 in the first transceiver 205 to, for instance, receive the PD-LUT. The components of the optical network 400 may be arranged as shown or in any other suitable manner.

The calibrator 410 may generate the PD-LUT, and the RX 255 may provide the PD-LUT to the TX 280. The TX 280 may transmit the PD-LUT to the first transceiver 205 via the coupler 275 and the medium 245. The RX 240 may receive the PD-LUT via the medium 245 and the coupler 235. The RX 240 may provide the PD-LUT to the TX 210, and the compensator 420 may compensate signals in the TX 210 based on the PD-LUT. The operation of the calibrator 410 and the compensator 420 are described more fully below.

Figure 5:
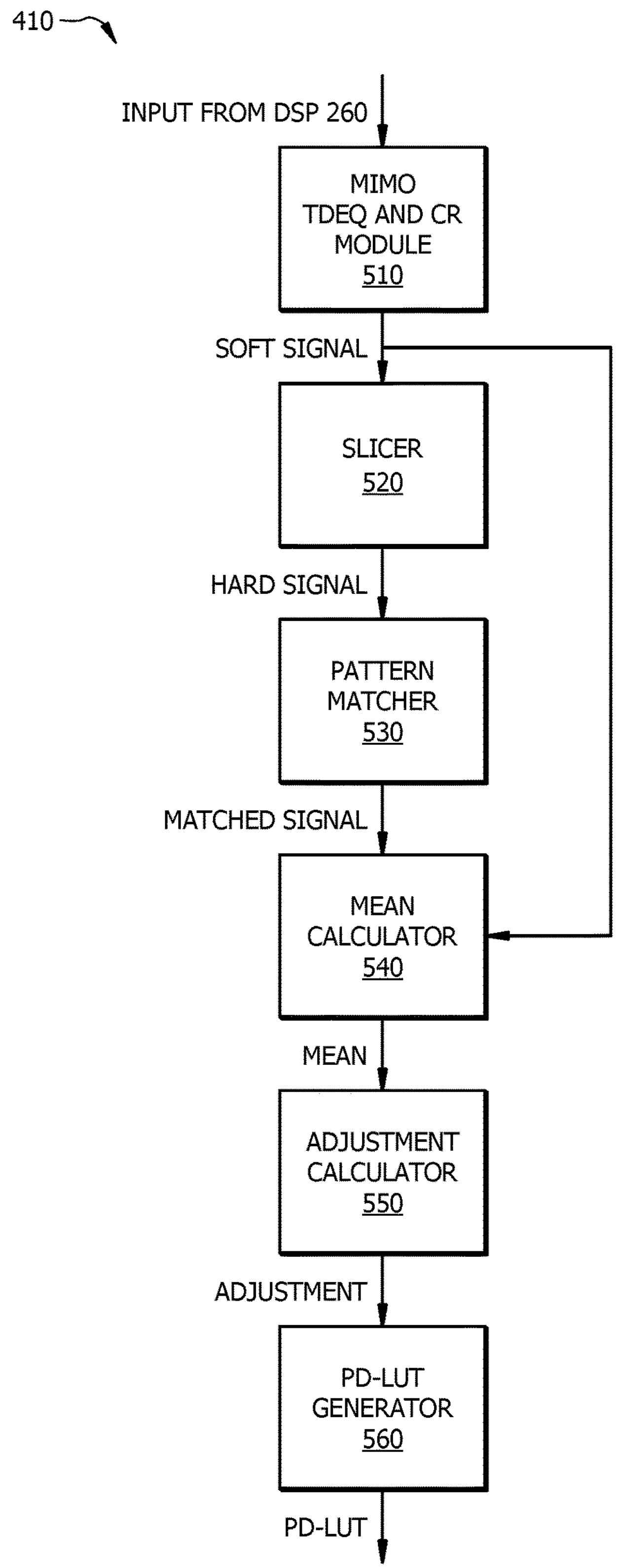
FIG. 5 is a schematic diagram of the calibrator in the optical network in FIG. 4 according to an embodiment of the disclosure.

FIG. 5 is a schematic diagram of the calibrator 410 in the optical network 400 in FIG. 4 according to an embodiment of the disclosure. The calibrator 410 may comprise modules, including a multiple-input and multiple-output (MIMO) TDEQ and CR module 510; a slicer 520; a pattern matcher 530; a mean calculator 540; an adjustment calculator 550; and a PD-LUT generator 560. The components of the calibrator 410 may be arranged as shown or in any other suitable manner. Some of the components may comprise multiple inputs and multiple outputs that may, for instance, run in parallel; however, the components may be simplified for easier understanding.

The calibrator 410 may output four PD-LUTs, one for each of an $X_I$ component, an $X_Q$ component, a $Y_I$ component, and a $Y_Q$ component. The $X_I$ component may correspond to an X-polarization and I component of a signal, the $X_Q$ component may correspond to an X-polarization and Q component of the signal, the $Y_I$ component may correspond to a Y-polarization and component of the signal, and the $Y_Q$ component may correspond to a Y-polarization and Q component of the signal. The calibrator 410 is described further below with respect to an arbitrary component of the signal.

The MIMO TDEQ and CR module 510 may receive an input from the DSP 260 of the RX 255. The input from the DSP 260 may result from known digital signal processing (DSP) techniques applied in, for instance, upstream modules of the DSP 260. The MIMO portion of the MIMO TDEQ and CR module 510 may demultiplex the X and Y components of the input from the DSP 260. The TDEQ portion of the MIMO TDEQ and CR module 510 may equalize linear distortion of the signal. The CR portion of the MIMO TDEQ and CR module 510 may recover a phase of modulation. For instance, the signal may have been modulated using quadrature amplitude modulation (QAM). The output of the MIMO TDEQ and CR module 510 may be a soft signal comprising the $X_I$ component, the $X_Q$ component, the $Y_I$ component, and the $Y_Q$ component. A soft signal may refer to the signal actually received. In other words, the soft signal may result from noise and distortion and thus may not correspond to the discrete levels of the modulation scheme.

The slicer 520 may compare the soft signal to the discrete levels of the modulation scheme. The slicer 520 may then convert the soft signal to a hard signal based on the comparison. A hard signal may refer to a signal with symbols corresponding to the discrete levels of the modulation scheme.

The pattern matcher 530 may compare the hard signal to mapped levels, which may be based on an arbitrary scheme. The arbitrary scheme may have the same number of levels as the modulation scheme, but use different levels. The pattern matcher 530 may then convert the hard signal to a matched signal based on the comparison. The pattern matcher 530 may also calculate a pattern index by multiplying the first symbol in the first sequence of the signal by the number of matched levels raised to the power of the symbol number, multiplying the second symbol in the first sequence of the signal by the number of matched levels raised to the power of the symbol number, and so on for each symbol, then adding the quantities together.

The mean calculator 540 may calculate a mean of the center symbol of each sequence of the soft signal. The adjustment calculator 550 may subtract the mean from the center symbols of the hard signal to obtain the adjustment. The center symbol for each of the sequences corresponding to a pattern index will be the same.

Finally, the PD-LUT generator 560 may generate a PD-LUT based on the pattern index and the adjustment. The PD-LUT may further comprise additional pattern indices with their respective adjustments. The PD-LUT generator 560 may similarly generate PD-LUTs for each $X_I$ component, $X_Q$ component, $Y_I$ component, and $Y_Q$ component of the signal inputted from the DSP 260. The RX 255 may provide the PD-LUTs to the TX 280, and the TX 280 may transmit the PD-LUTs to the first transceiver 205 via the coupler 275 and the medium 245.

As an example, the calibrator 410 may receive from the DSP 260 a signal with sequences comprising five consecutive symbols (i.e., a pattern length of five) and modulated using 16-QAM, which may yield four discrete levels (e.g., −3, −1, 1, and 3). The number of unique patterns may therefore be $4^5$, or 1,024. The range of the pattern index may therefore be 0-1,023 or 1-1,024. After performing its functions, the MIMO TDEQ and CR module 510 may then output the soft signal as follows:

$$(-3.1, -2.8, -1.2, 1.2, 3.2)$$
$$(-3.2, -2.9, -1.1, 1.4, 2.9)$$
$$(-2.9, -2.7, -0.8, 1.1, 3.1). \quad (1)$$

The slicer 520 may compare the soft signal (1) to the four discrete levels, −3, −1, 1, and 3. For instance, −3.1 in the first symbol of the first sequence may be closer to −3 than to any other discrete level, −2.8 in the second symbol of the first sequence may be closer to −3 than to any other discrete level, −1.2 in the third symbol of the first sequence may be closer to −1 than to any other discrete level, 1.2 in the fourth symbol of the first sequence may be closer to 1 than to any other discrete level, and 3.2 in the fifth symbol of the first sequence may be closer to 3 than to any other discrete level. The slicer 520 may similarly compare the remaining sequences to obtain the following hard signal:

$$(-3, -3, -1, 1, 3)$$
$$(-3, -3, -1, 1, 3)$$
$$(-3, -3, -1, 1, 3). \quad (2)$$

The pattern matcher 530 may match the hard signal (2) to a matched signal based on four mapped levels 0, 1, 2, and 3). The hard signal (2) may therefore become the following matched signal:

$$(0, 0, 1, 2, 3)$$
$$(0, 0, 1, 2, 3)$$
$$(0, 0, 1, 2, 3). \quad (3)$$

The pattern matcher 530 may also calculate the pattern index of the matched signal (3) by multiplying the first symbol in the first sequence of the signal by the number of matched levels (i.e., 4) raised to the power of the symbol number (i.e., 0), multiplying the second symbol in the first sequence of the signal by the number of matched levels (i.e., 4) raised to the power of the symbol number i.e., 1), and so on for each symbol, then adding the quantities together as follows:

$$(0\times4^0)\pm(0\times4^1)+(1\times4^2)+(2\times4^3)+(3\times4^4)=912. \quad (4)$$

The mean calculator 540 may then calculate the mean of the center (i.e., third) symbol of each sequence of the soft signal (1) as follows:

$$\frac{(-1.2)+(-1.1)+(-0.8)}{3} = -1.03. \quad (5)$$

The adjustment calculator 550 may subtract the mean (5) from the center symbol of the hard signal (2) to obtain the adjustment as follows:

$$(-1)-(-1.03)=0.03. \quad (6)$$

Finally, the PD-LUT generator 560 may generate a PD-LUT based on the pattern index (4), 912, and the adjustment (6), 0.03.

Figures 6, 7:
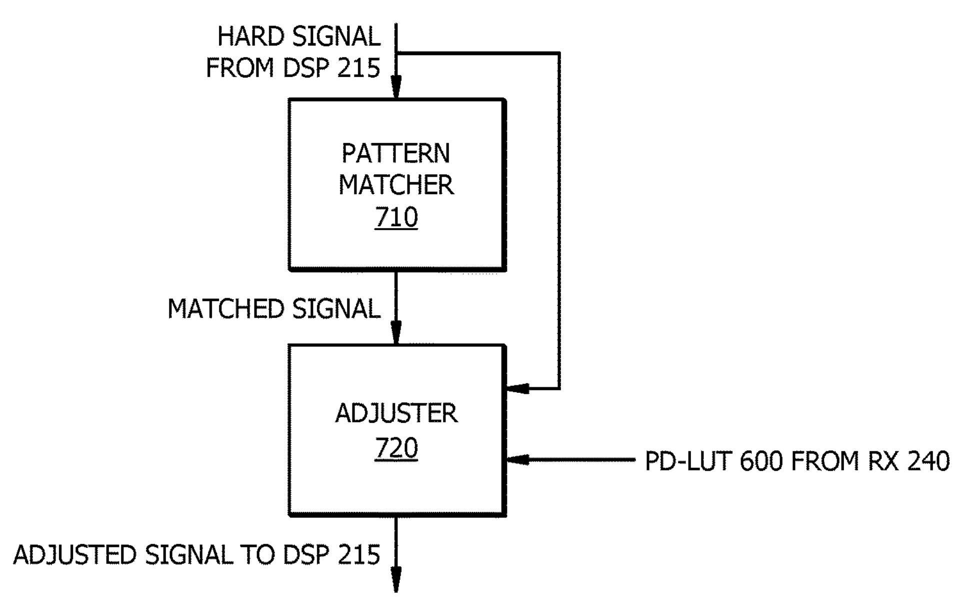
FIG. 6 is an example of a pattern-dependent look-up table (PD-LUT) according to an embodiment of the disclosure.
FIG. 7 is a schematic diagram of the compensator in the optical network in FIG. 4 according to an embodiment of the disclosure.

FIG. 6 is an example of a PD-LUT 600 according to an embodiment of the disclosure. The PD-LUT 600 may be, for instance, a PD-LUT generated by the PD-LUT generator 560. As shown, the PD-LUT 600 may comprise the pattern index (4), 912, and the adjustment (6), 0.03. The PD-LUT 600 may further comprise, for instance, pattern indices 896 and 976 and their respective adjustments, 0.06 and 0.04. Finally, the PD-LUT 600 may further comprise additional pattern indices and their respective adjustments as indicated by the ellipses. As described above, there may be up to 1,024 unique pattern indices.

FIG. 7 is a schematic diagram of the compensator 420 in the optical network 400 in FIG. 4 according to an embodiment of the disclosure. The compensator 420 may comprise modules, including a pattern matcher 710, and an adjuster 720. The components of the compensator 420 may be arranged as shown or in any other suitable manner. Some of the components may comprise multiple inputs and multiple outputs that may, for instance, run in parallel; however, the components may be simplified for easier understanding. The compensator 420 may output an $X_I$ component, an $X_Q$ component, a Y-I component, and a $Y_Q$ component. The compensator 420 is described further below with respect to an arbitrary component of the signal.

The pattern matcher 710 may receive an input from the DSP 215 of the TX 210. The input from the DSP 215 may result from known DSP techniques applied in, for instance, upstream modules of the DSP 260. Such upstream modules may comprise a slicer similar to the slicer 520 so that the input from the DSP 215 is a hard signal. The pattern matcher 710 may compare the hard signal to mapped levels, which may be based on an arbitrary scheme. The arbitrary scheme may have the same number of levels as the modulation scheme, but use different levels. The pattern matcher 710 may then convert the hard signal to a matched signal based on the comparison. The pattern matcher 710 may also calculate a pattern index by multiplying the first symbol in the first sequence of the signal by the number of matched levels raised to the power of the symbol number, multiplying the second symbol in the first sequence of the signal by the number of matched levels raised to the power of the symbol number, and so on for each symbol, then adding the quantities together.

The adjuster 720 may input a PD-LUT, for instance the PD-LUT 600, from the RX 240 in the first transceiver 205, which the RX 240 may have received from the TX 280 in the second transceiver 250. The adjuster 720 may then look up in the PD-LUT the pattern index calculated by the pattern matcher 710, then determine the adjustment in the PD-LUT corresponding to that pattern index. The adjuster 720 may then adjust the center symbol of each sequence of the hard signal by the adjustment.

It is known that calculating an adjustment of the center symbol in a sequence of a signal, then compensating that center symbol, may reduce impairments. If, however, a sequence has an even number of symbols, then the center two symbols may be compensated. Similarly, symbols other than the center symbol or symbols may be compensated in other applications.

As an example, the pattern matcher 710 may input the following hard signal:

$$(-3, -3, -1, 1, 3) \tag{7}$$

The pattern matcher 710 may match the hard signal (7) to a matched signal based on the four mapped levels, 0, 1, 2, and 3, to obtain the following matched signal:

$$(0, 0, 1, 2, 3). \tag{8}$$

In the same way as described for the pattern matcher 530, the pattern matcher 710 may also calculate the pattern index of the matched signal (8) as follows:

$$(0\times4^0)+(0\times4^1)+(1\times4^2)+(2\times4^3)+(3\times4^4)=912. \tag{9}$$

The adjuster 720 may then look up in the PD-LUT 600 the pattern index (9) and determine a corresponding adjustment for that pattern index. As described above and as shown in FIG. 6, 0.03 is the adjustment corresponding to the pattern index of 912. Accordingly, the adjuster 720 may adjust the center symbol of the hard signal (7) by 0.3 to obtain the following adjusted signal:

$$(-3, -3, -0.97, 1, 3). \tag{10}$$

Finally, the adjuster 720 may provide the adjusted signal (10) to the DSP 215. For instance, the adjuster 720 may provide the adjusted signal (10) to downstream modules of the DSP 215. Such downstream modules may apply known DSP techniques.

Figure 8:
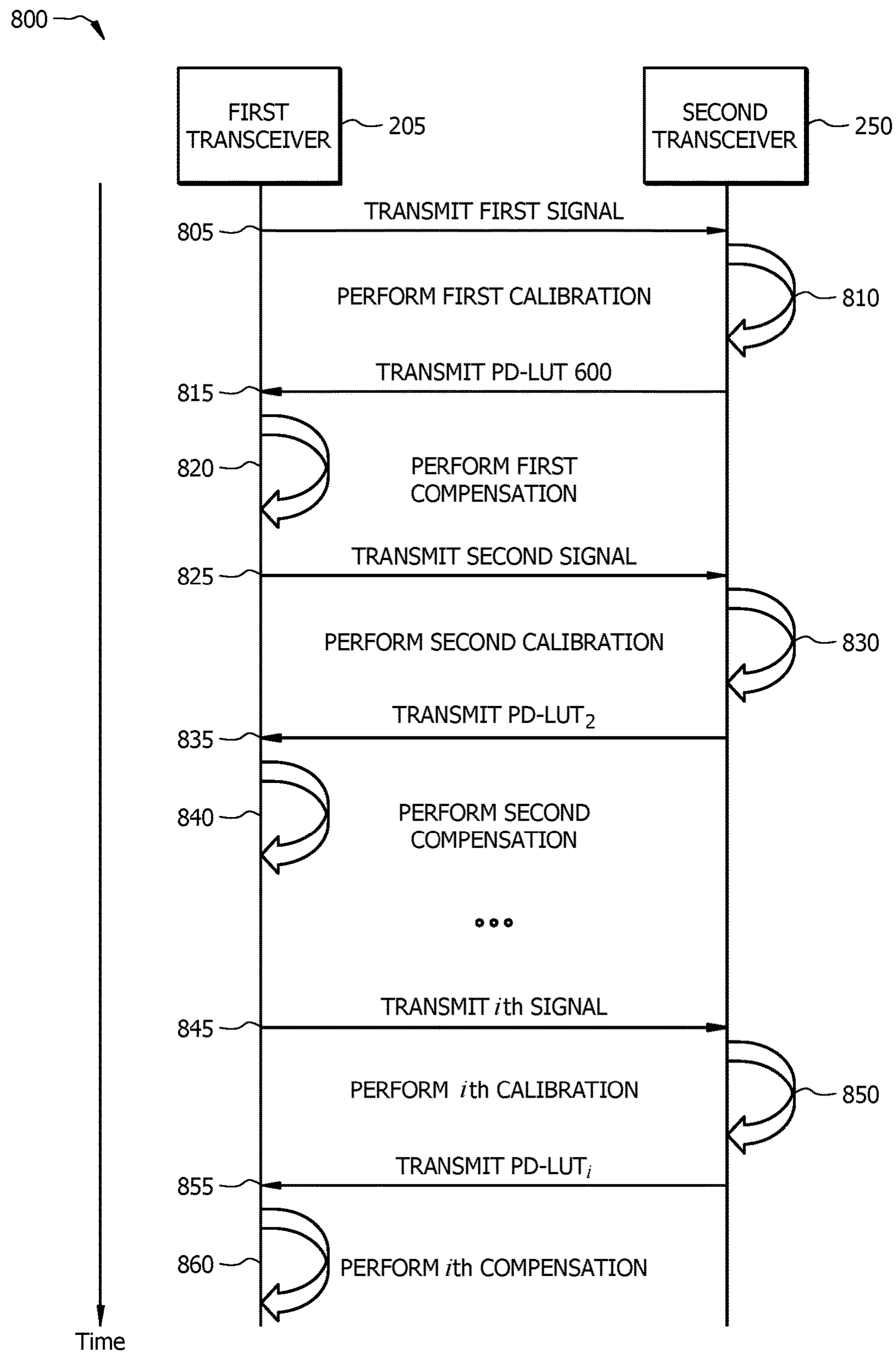
FIG. 8 is a message sequence diagram illustrating iterative calibration and compensation scheme according to an embodiment of the disclosure.

FIG. 8 is a message sequence diagram illustrating iterative calibration and compensation scheme 800 according to an embodiment of the disclosure. The optical network 400 may implement the scheme 800. Specifically, the first transceiver 205 and the second transceiver 250 may implement the scheme 800, though the same principles may apply between any suitable transmitter and receiver.

At step 805, the first transceiver 205 may transmit a first signal to the second transceiver 250. At step 810, the second transceiver 250 may perform a first calibration, for instance in the calibrator 410, to produce a PD-LUT, for instance the PD-LUT 600. The calibrator 410 may perform the first calibration based on the first signal. At step 815, the second transceiver 250 may transmit the PD-LUT 600 to the first transceiver 205. At step 820, the first transceiver 205 may perform a first compensation, for instance in the compensator 420. For instance, the compensator 420 may compensate subsequent transmissions by applying to those transmissions the adjustments in the PD-LUT 600. Steps 805 to 820 may comprise a first iteration of calibration and compensation.

The first iteration may not, however, fully compensate the signals that the first transceiver 205 transmits. The scheme 800 may therefore comprise additional iterations of calibration and compensation. Accordingly, at step 825, the first transceiver 205 may transmit a second signal to the second transceiver 250. The second signal may be compensated based on the PD-LUT 600. At step 830, the calibrator 410 may perform a second calibration to produce a PD-LUT $\Delta_2$. The PD-LUT $\Delta_2$ may provide adjustments to be added to the adjustments from the PD-LUT 600 to form anew PD-$LUT_2$. For instance, for a pattern index of 912, the PD-LUT $\Delta_2$ may provide an adjustment of 0.005 to add to the adjustment of 0.03 in the PD-LUT 600 to form a new PD-$LUT_2$ with an adjustment of 0.035 for a pattern index of 912. The calibrator 410 may perform the second calibration in the same manner that it performed the first calibration, except that the calibrator may do so based on the second signal. At step 835, the second transceiver 250 may transmit the PD-$LUT_2$ to the first transceiver 205. At step 840, the compensator 420 may perform a second compensation. For instance, the compensator 420 may compensate subsequent transmissions by applying to those transmissions the adjustments in the PD-$LUT_2$. Steps 825 to 840 may comprise a second iteration of calibration and compensation.

The scheme 800 may comprise similar additional iterations of calibration and compensation until an ith iteration at steps 845 to 860. I may be any positive integer. Each successive iteration may provide a finer granularity of compensation. The first transceiver 205, the second transceiver 250, or another component may request a first or subsequent iteration.

Figure 9:
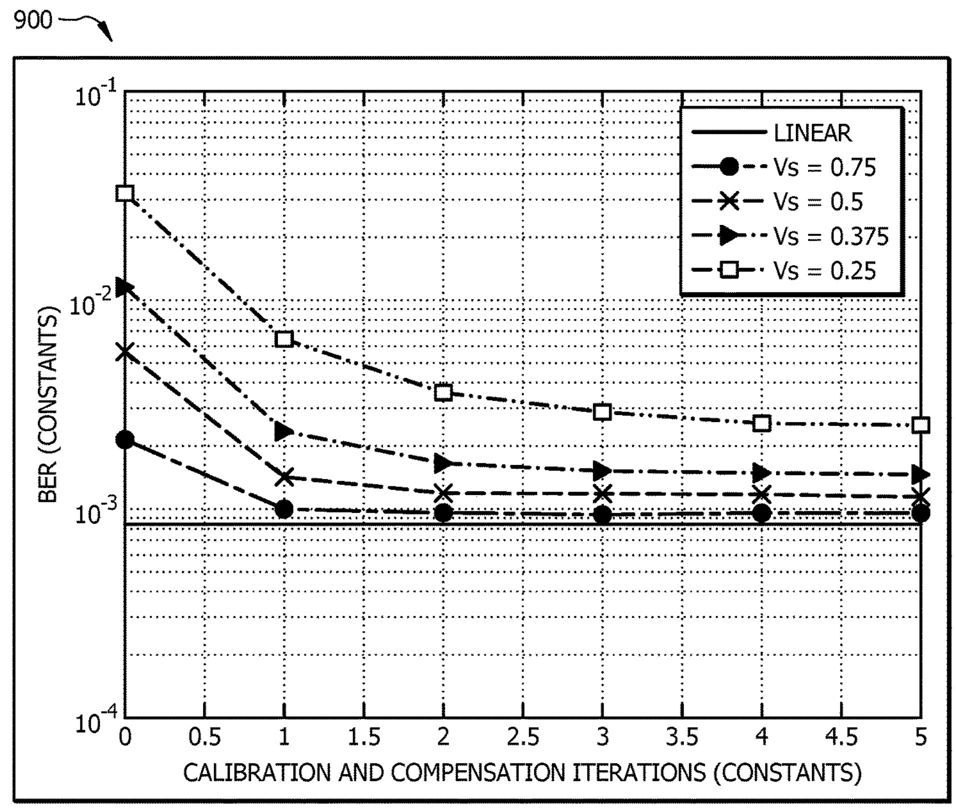
FIG. 9 is a graph of a modeled bit error rate (BER) for the optical network in FIG. 4.

FIG. 9 is a graph 900 of a modeled BER for the optical network 400 in FIG. 4. As shown, the x-axis represents calibration and compensation iterations as constants, and the y-axis represents BER as constants or arbitrary units. Nonlinearity of the RFA 225 may be modeled using the Rapp model, which is well-known in the art and described in many sources, including in John Liebetreu, et al., "Proposed System Impairment Models," IEEE 802.16 Broadband Wireless Access Working Group, Mar. 8, 2000, which is incorporated by reference. The graph 900 shows BERs for a pattern length of five and for different saturation voltages, which are represented as $V_S$ and described in Rapp. $V_S$ may be inversely proportional to the non-linearity of the RFA 225. The solid line may represent a linear RFA 225.

As can be seen, the BER may decrease for each successive iteration, though improvement may begin to level off around three iterations. A $V_S$ of 0.75 volts (V) yields a relatively low BER, while lower $V_S$ values yield relatively higher BERs. The successive iterations may not fully compensate the non-linearity, particularly for the lower $V_S$ values. That inability to compensate may be due to the relatively short pattern length of five used in this example, which may not fully compensate for the patterning effects.

Figure 10:
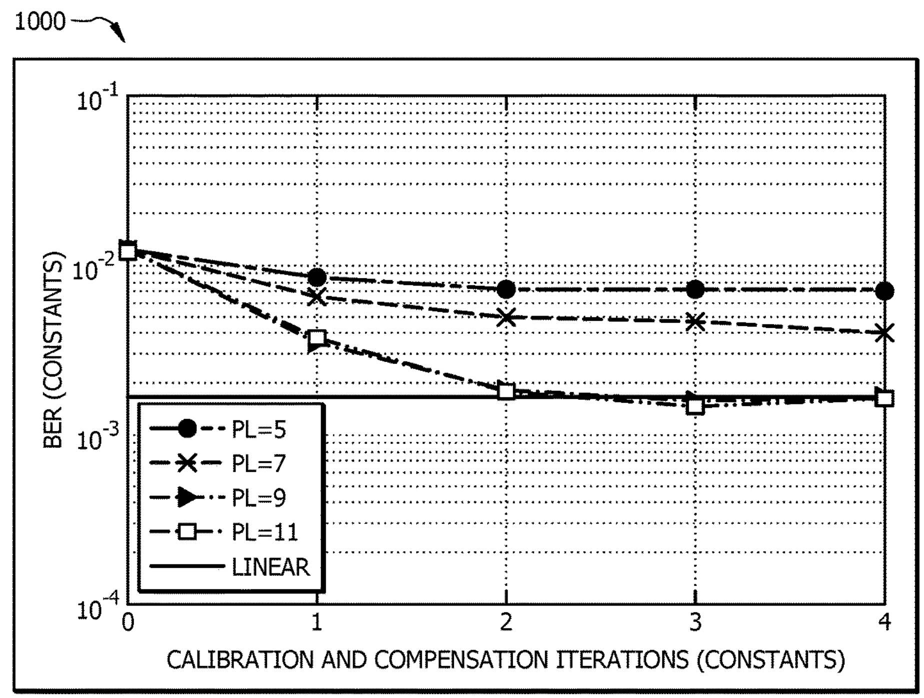
FIG. 10 is another graph of a modeled BER for the optical network in FIG. 4.

FIG. 10 is another graph 1000 of a modeled BER for the optical network 400 in FIG. 4. As shown, the x-axis represents calibration and compensation iterations as constants, and the y-axis represents BER as constants or arbitrary units. Once again, the Rapp model may be used. Compared to the graph 900, however, the graph 1000 shows BERs for a $V_S$ of 0.5 V, a pre-compensation dispersion at the DSP 215 of 300 picoseconds (ps)/nanometer (nm), a post-compensation dispersion at the DSP 260 of −300 ps/nm, and different pattern lengths, which are represented as PL. Once again, the solid line may represent a linear RFA 225.

As can be seen, a higher pattern length yields a lower BER, particularly after successive iterations. Once again, however, the BER improvement may begin to level off around three iterations. A pattern length of nine may nearly fully compensate the patterning effects due to a combination of pre-compensation dispersion and RFA 225 non-linearity.

Figure 11:
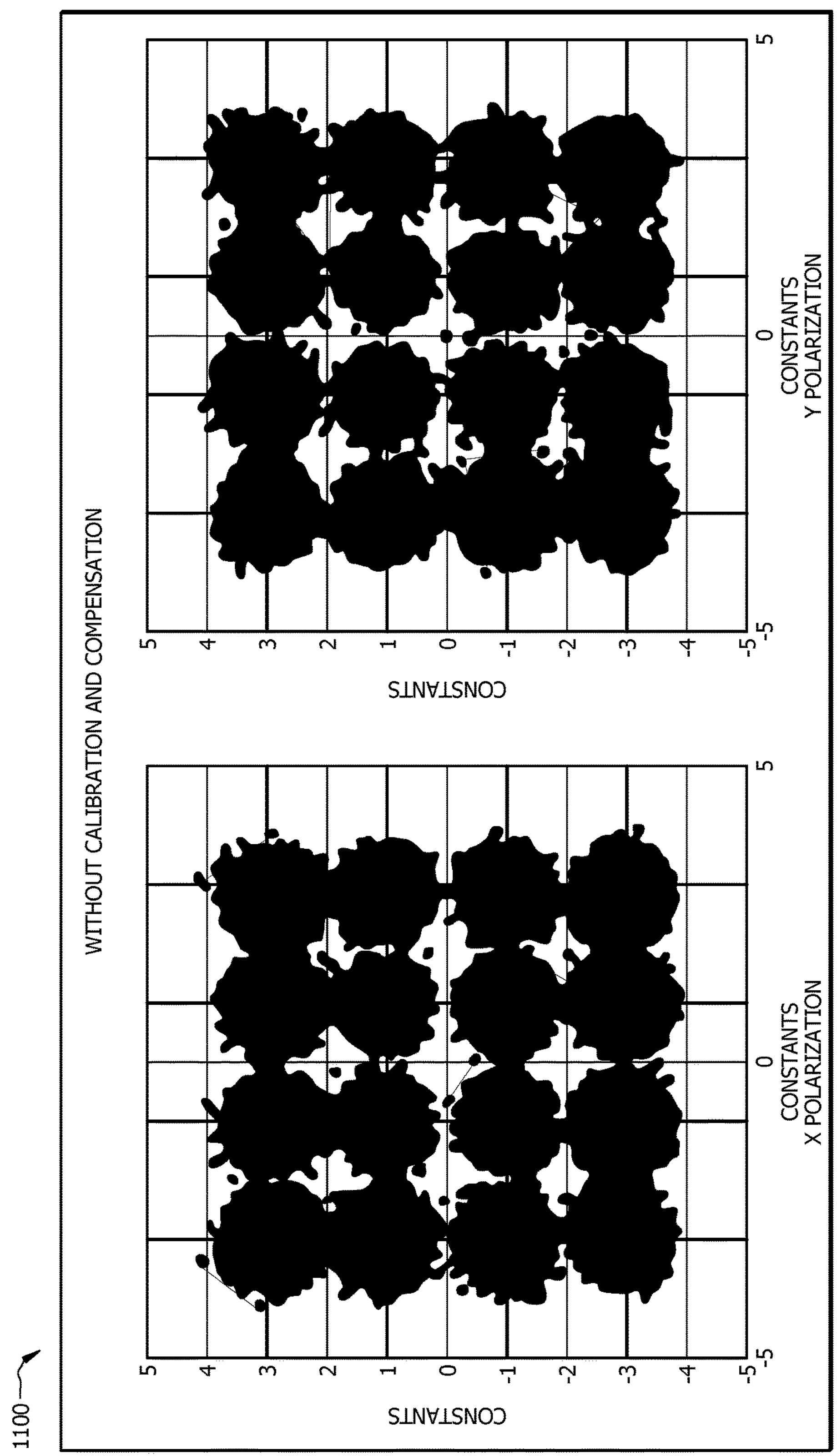
FIG. 11 is a graph of an experimental symbol constellation for the optical network in FIG. 4.
Figure 12:
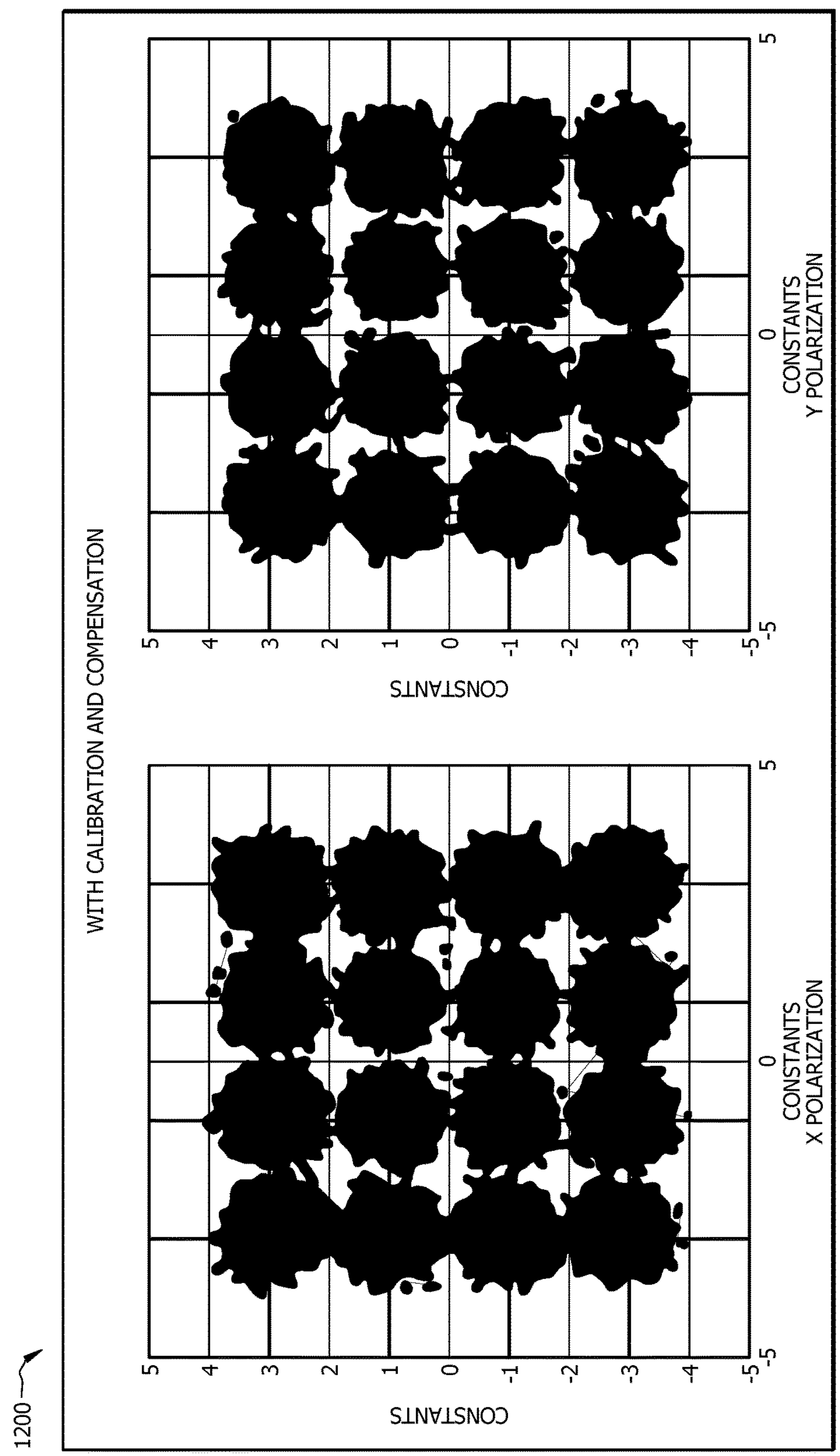
FIG. 12 is another graph of an experimental symbol constellation for the optical network in FIG. 4.

FIG. 11 is a graph 1100 of an experimental symbol constellation for the optical network 400 in FIG. 4. FIG. 12 is another graph 1200 of an experimental symbol constellation for the optical network 400 in FIG. 4. The graph 1100 is shown before applying the disclosed calibration and compensation, and the graph 1200 is shown after applying the disclosed calibration and compensation. As shown, for both the graph 1100 and the graph 1200, both the x-axis and the y-axis represent constants or arbitrary units. The graph 1100 and the graph 1200 are obtained experimentally based on the following:

- polarization-multiplexed 16-QAM (PM-16QAM) transmission;
- 36 gigabaud (Gbaud) transmission;
- a polarization-multiplexed I and Q (PM-IQ) modulator;
- driving signals for the modulators generated electrically from eight-bit, four-channel, high-speed DACs with sampling rates up to 65 Gbaud;
- a $2^{15}$-1 pseudo-random bit sequence (PRBS);
- Nyquist RRC pulse-shaping with a roll-off factor of 0.1;
- detection of the signal by a polarized, diversified, coherent detector;
- recordation of the signal using a 50 Gbaud Tektronix real-time digital sampling oscilloscope (DSO) with a 20 gigahertz (GHz) electrical bandwidth; and
- signal processing using an offline DSP code package comprising an FDEQ, a TDEQ, and a CR module.

As can be seen, the symbols in the graph 1100 are grouped together in 16 circles, but the circles are not neatly defined. In the graph 1200, however, the 16 circles are more neatly defined, compact, and equally spaced apart. In other words, the symbols are more closely aligned with the PM-16QAM grid. The experimental BER in FIG. 11 is $1.67e^{-4}$, while the experimental BER in FIG. 12 is $6.3e^{-5}$, thus showing substantial improvement in BER.

Figure 13:
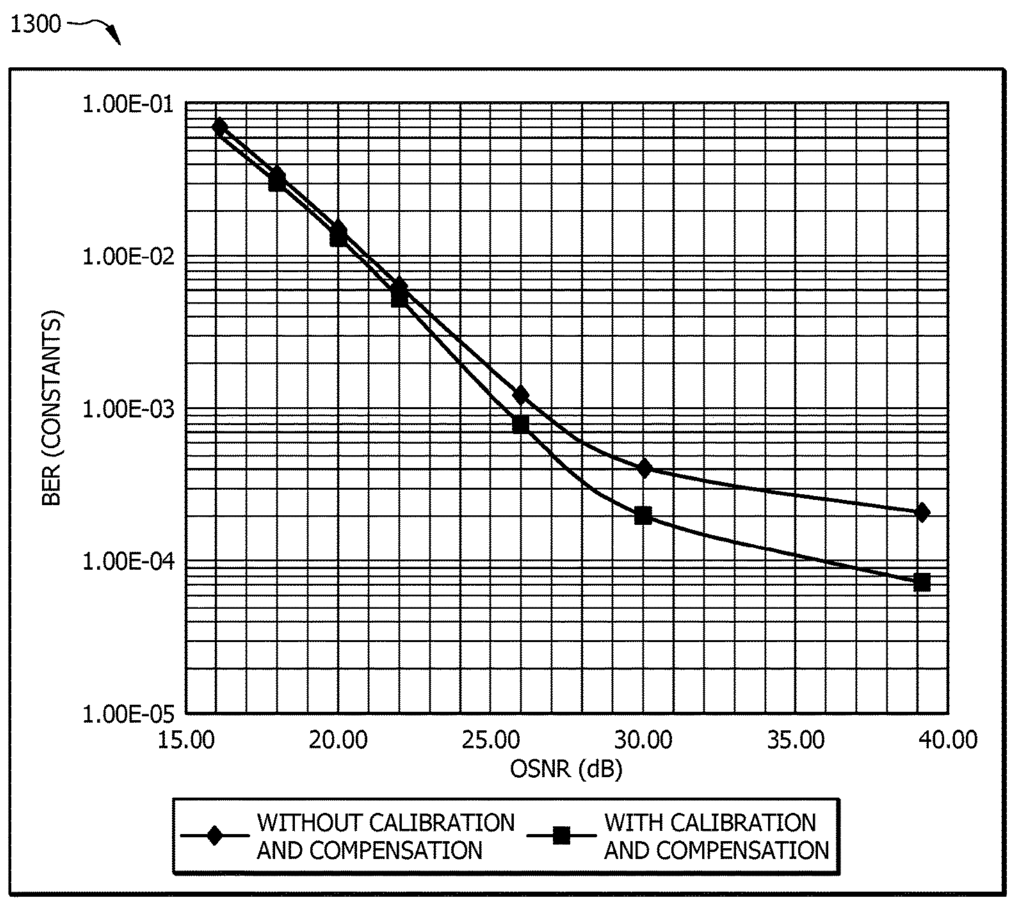
FIG. 13 is a graph of experimental optical signal-to-noise ratio (OSNR) versus BER for the optical network in FIG. 4.

FIG. 13 is a graph 1300 of experimental OSNR versus BER for the optical network 400 in FIG. 4. As shown, the x-axis represents OSNR in decibels (dB), and the y-axis represents BER in constants or arbitrary units. The graph 1300 is based on a $V_G$ of 2 V, where $V_G$ is a voltage related to the RFA 225. The graph 1300 shows OSNR versus BER before applying the disclosed calibration and compensation and after applying the disclosed calibration and compensation. As can be seen, the disclosed calibration and compensation may significantly decrease the BER, particularly as the OSNR increases.

Figure 14:
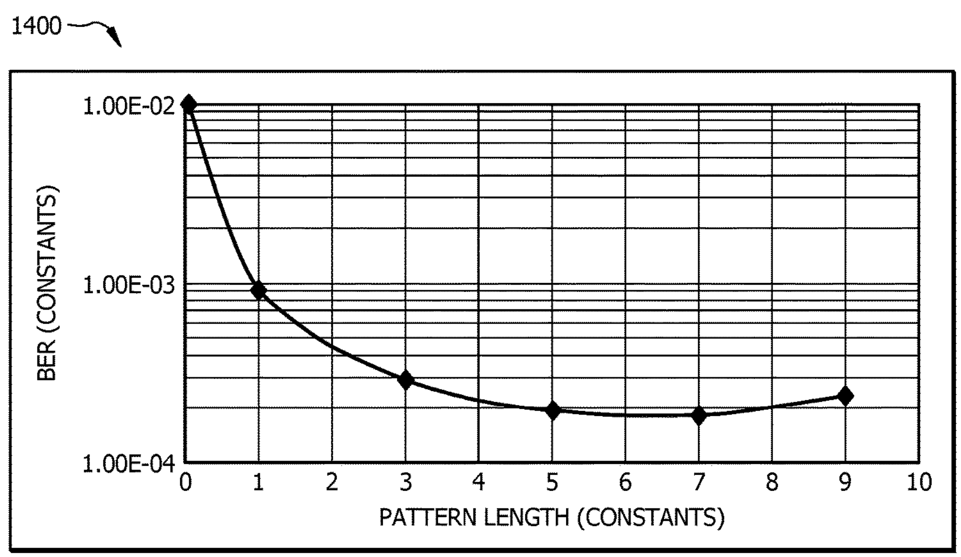
FIG. 14 is a graph of experimental pattern length versus BER for the optical network in FIG. 4.

FIG. 14 is a graph 1400 of experimental pattern length versus BER for the optical network 400 in FIG. 4. As shown, the x-axis represent pattern length in constants or arbitrary units, and the y-axis represents BER in constants or arbitrary units. The graph 1400 is based on a single iteration of calibration and compensation. As can be seen, the BER may significantly decrease as the pattern length increases, though improvement may begin to level off around a pattern length of four to five. The BER may begin to decrease as the pattern length increases beyond seven.

Figure 15:
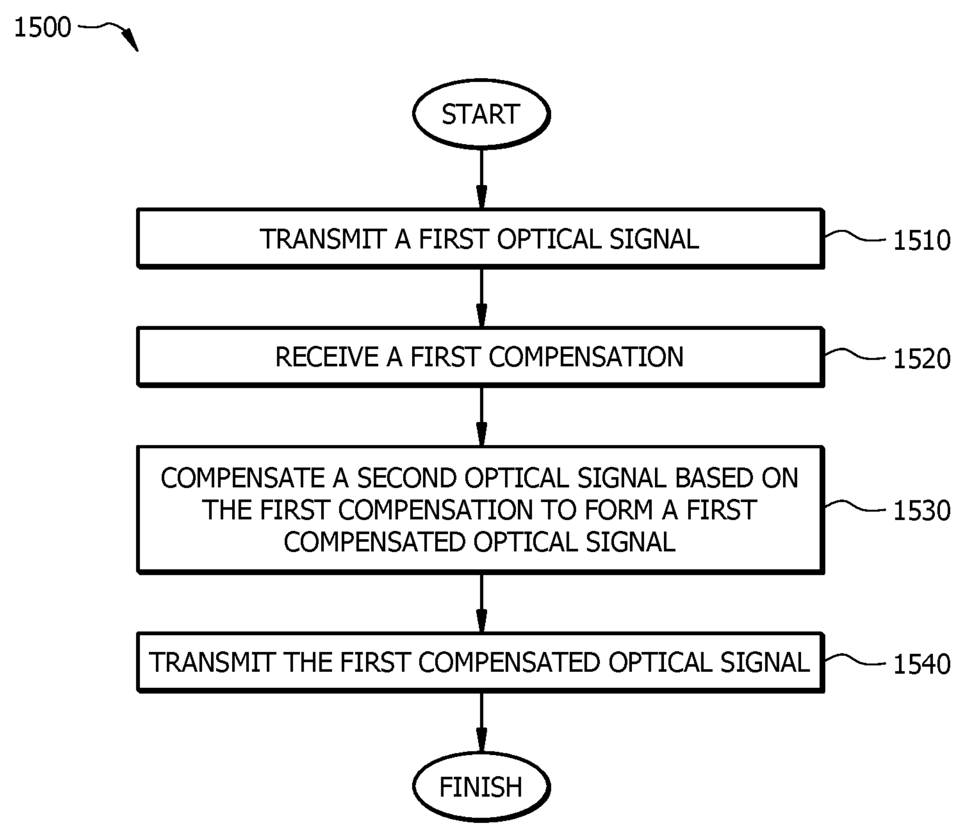
FIG. 15 is a flowchart illustrating a method of transmitter impairment compensation according to an embodiment of the disclosure.

FIG. 15 is a flowchart illustrating a method 1500 of transmitter impairment compensation according to an embodiment of the disclosure. The method 1500 may be implemented in the first transceiver 205, for instance in the TX 210. At step 1510, a first optical signal may be transmitted. At step 1520, a first compensation may be received. For instance, the TX 210 may receive the PD-LUT 600 from the second transceiver 250, for instance from the RX 255. The first compensation may be based on a pattern-dependent analysis of the first optical signal. At step 1530, a second optical signal may be compensated based on the first compensation to form a first compensated optical signal. For instance, the compensator 420 may compensate the second optical signal based on the PD-LUT 600. At step 1540, the first compensated optical signal may be transmitted.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_1$, and an upper limit, $R_u$, is disclosed, any number falling within the range is specifically disclosed. In particular, the following numbers within the range are specifically disclosed: $R=R_1+k*(R_u-R_1)$, wherein k is a variable ranging from 1 percent to 100 percent with a 1 percent increment, i.e., k is 1 percent, 2 percent, 3 percent, 4 percent, 5 percent, 50 percent, 51 percent, 52 percent, 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An optical receiver comprising:

an optical-to-electrical converter (OEC);

an analog-to-digital converter (ADC) coupled to the OEC; and a digital signal processor (DSP) coupled to the ADC and comprising a calibrator, wherein the calibrator comprises:

a multiple-input and multiple-output (MIMO) time-domain equalizer (TDEQ) and carrier recovery (CR) module;

a slicer coupled to the MIMO TDEQ and CR module;

a pattern matcher coupled to the slicer;

a mean calculator coupled to the pattern matcher;

an adjustment calculator coupled to the mean calculator; and a pattern-dependent look-up table (PD-LUT) generator coupled to the adjustment calculator.

2. The optical receiver of claim 1, wherein the PD-LUT generator is configured to generate a first PD-LUT based on a first signal generated outside the optical receiver.

3. The optical receiver of claim 2, wherein the PD-LUT generator is configured to generate a PD-LUT Δ based on a second signal generated outside the optical receiver, wherein Δ represents an increment to the first PD-LUT, and wherein the second signal is compensated based on the first PD-LUT.

4. The optical receiver of claim 3, wherein the PD-LUT generator is configured to generate a second PD-LUT by adding values of the PD-LUT Δ to values of the first PD-LUT.

* * * * *